Jan. 2, 1973  B. T. JUNKER ETAL  3,708,566
METHOD FOR POLYMER CASTING FROM INLET RESERVOIR
Filed Aug. 27, 1968  3 Sheets-Sheet 1

INVENTORS
BERNHARD T. JUNKER
TERRY G. BREEDING
MICHAEL T. HOYT
BY ROSS M. HEDRICK

Paul M. Henk
ATTORNEY

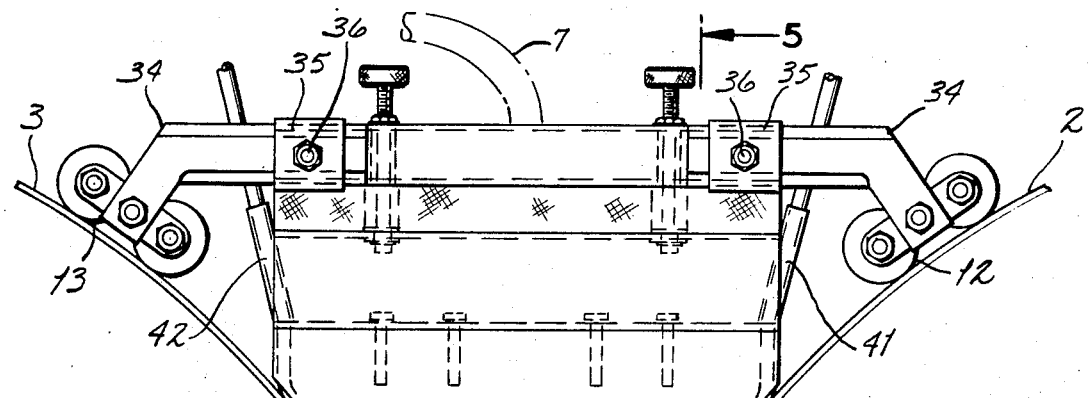
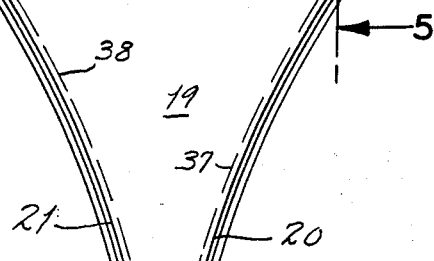
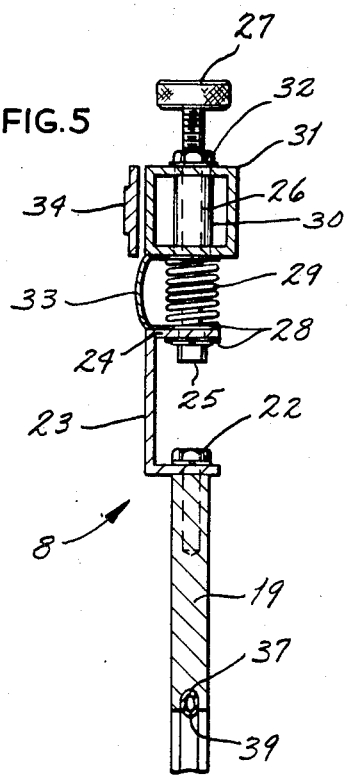
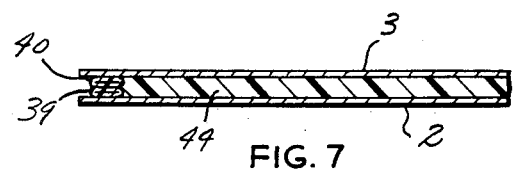

3,708,566
METHOD FOR POLYMER CASTING FROM INLET RESERVOIR

Bernhard T. Junker, Foster City, Calif., and Terry G. Breeding, University, and Michael T. Hoyt and Ross M. Hedrick, St. Louis, Mo., assignors to Monsanto Company, St. Louis, Mo.
Continuation-in-part of application Ser. No. 495,284, Oct. 12, 1965. This application Aug. 27, 1968, Ser. No. 755,664
The portion of the term of the patent subsequent to Jan. 14, 1986, has been disclaimed
Int. Cl. B29d 7/14
U.S. Cl. 264—171                                      4 Claims

ABSTRACT OF THE DISCLOSURE

An inlet reservoir for use in conjunction with a continuous polymer casting machine which forms an endless sheet or film of a polymeric material within a cavity developed between a pair of mold forming surfaces; said reservoir including a pair of side plates that are designed to conform to the shape of the proximate mold forming surfaces, and including movable sealing gaskets that dispose intermediate the edges of said plates and the mold forming surfaces to preclude seepage of the retained monomer or polymer. This reservoir is of adjustable width, and support means upon the plates includes expandable bracing that regulates the reservoir width, and also casters that ride upon the mold forming surfaces stabilize the reservoir in relation to said surfaces. Since the sealing gaskets further extend between the mold forming surfaces, and are pressed firmly therein, movement of these surfaces during the casting operation also sustains movement of the gaskets, while the gaskets simultaneously act as edge-sealing means for the mold cavity thereby preventing leakage of the polymer while being cast.

CROSS REFERENCE TO RELATED APPLICATION

The subject matter of this application is related to and comprises a continuation-in-part of the application of Bernhard T. Junker and Ross M. Hedrick, Ser. No. 495,284, filed Oct. 12, 1965, and owned by a common assignee.

BACKGROUND OF THE INVENTION

This invention relates in general to the supplying and feeding of a quantity of polymeragenic composition into a continuous casting machine, and more particularly, relates to the construction and performance of an inlet reservoir which mounts proximate the entrance to the mold cavity of a casting machine, and which incorporates movable sealing means for retarding leakage of the composition while confined in the reservoir and as it is being subjected to casting within the machine.

Many apparatuses of various designs have been assembled and used in the casting or forming of sheets, films, frequently of continuous lengths, and other articles from plastic, metal, or related materials. In most instances, the apparatuses employed and their methods of operation generally orient the casting chamber or channel in a proximate horizontal direction, with the material to be cast being fed into the chamber at one end. The problems associated with casting sheet material in this manner do not become evident until the particular material being cast is formulated from a variety of ingredients having significantly differing specific gravities. Additionally, the prior art casting machines that are assembled having a mold cavity that extends approximately in a vertical direction occasionally exhibit similar problems in materials handling unless the introduction of the material to be cast into the molding location is properly handled and is worked under a predetermined degree of superimposed pressure that maintains the material prior to and during casting as a homogeneous mixture, retarding its settling into a segregated mass.

Under known methods, the means for advancing the materials to be cast into the mold cavity of a machine simply includes the use of a funnel or hopper-like apparatus that deposits the molding materials near the entrance to the cavity. Under such an arrangement not only does some of the material fail to enter into the mold cavity, frequently becoming lost, but the proper control of the material, such as a slight exertion of pressure to sustain the mixture and achieve uniform compactness, along with regulation of mold dimensions, cannot be easily acquired. Other methods for molding materials in a vertical position have generally included depositing the material to be cast upon one or more horizontally aligned portions of the continuous belts that eventually turn and direct the material through the vertically disposed mold. Performing the molding operation in the foregoing ways and introducing the composition to be cast into the mold cavity, as aforesaid, does not allow for a fine regulation in the prehandling of the casting material or composition as it is introduced into the mold cavity. Utilizing a feed inlet reservoir such as disclosed in the embodiment of the present invention allows not only for the continuous advancement of the material to be cast into the mold cavity, regardless whether the mold cavity be vertically, horizontally, or oriented to any other angularity, but sufficient quantity of the composition in the reservoir continuously subjects the feeding composition to that degree of head or hydrostatic pressure sufficient to maintain the composition of uniform consistency, and to reduce formation of voids or bubbles in the same. In addition, since the process of utilizing a reservoir for holding the casting composition proximate to the inlet of the mold cavity in the casting machine does not appear evident from the prior art, especially in incorporating movable sealing means for preventing leakage of said composition proximate to the area of contact of the reservoir to the mold forming surfaces of the machine while simultaneously employing the same means as edges for the composition being cast within the mold cavity, this two-fold benefit enhances the machine operatively, and comprises an improvement over known casting operations.

It is, therefore, an object of this invention to provide an inlet reservoir for placement proximate to the entrance of a casting machine, and being formed integral with said machine, the reservoir facilitating the proper control and maintenance of the composition being subjected to the casting operation.

It is another object of this invention to provide an inlet reservoir for use in conjunction with a continuous casting machine which is constructed to prevent any untimely or undesirable leakage of the composition confined by the reservoir, and additionally furnishes the edge sealing means for the mold cavity of said machine.

It is an additional object of this invention to provide a feed inlet reservoir for a casting machine which is adjustable thereby providing for variation in the widths of the articles being cast within the mold cavity of the machine.

A further object of this invention discloses that the reservoir may be adjusted with respect to its proximity to the mold forming surfaces of the casting machine, and thereby permits variation in the size of sealing means or gaskets employed to preclude untimely discharge of the composition being cast.

It is still another object of this invention to provide a method for introducing a moldable composition into a casting machine which may chemically or mechanically bond to the edge sealing means of the mold cavity.

Still a further object of this invention is to provide a reservoir assembly for use in introducing the composition to be molded within a casting machine which is capable of continuous operation, said reservoir being facile of adjustment and effective in usage.

Another object of this invention is to provide a method for introducing a moldable composition into a casting machine.

Other objects will become apparent to those skilled in the art in the light of the following description and accompanying drawings.

SUMMARY OF THE INVENTION

In the formation of articles in a casting machine, some means must be employed for supplying a sufficient quantity of moldable composition to the machine, and in this invention, a reservoir for use in conjunction with and in proximity to the entrance of the mold forming cavity of a continuous casting machine holds a sufficient quantity of the composition to be cast, allowing for its gradual and consistent feeding into the machine for working. The invention is described as being used for feeding a polymeragenic composition into a casting machine, and a polymeragenic composition may herein be defined as either a molten polymer, a fluid monomer, or a prepolymer or slurry that is capable of being converted and cast into a polymeric sheet, film, or other article in the aforesaid type casting machine. Examples of such polymeric compositions are more thoroughly analyzed in our parent application.

The reservoir is formed having a pair of side plates, with the edges of the plates being contoured to conform with and enter into contiguity with the shape of those mold forming surfaces proximate to the location where the composition is fed into the casting machine. These side plates, along with the adjacent mold forming surfaces, form a trough-like arrangement in which a quantity of the polymeragenic composition may be deposited to a desired level while some of it is simultaneously being introduced into the mold cavity. As previously briefly described, it is desirable under certain circumstances to maintain a quantity of hydrostatic pressure upon the composition that has already just advanced into the casting machine, and the location of the reservoir, as herein described in its relationship to the casting machine contributes this desirable feature. Since the reservoir seemingly rests upon mold forming surfaces that are constantly in motion during the continuing casting operation, it is necessary that some means be employed to prevent leakage of the retained casting composition within the reservoir especially from that area intermediate the edges of the plates in contiguity with the moving mold surfaces. Sealing means in the nature of lengths of gaskets are introduced between or close to the plate edges and the movable molding surfaces of the casting machine to preclude such seepage, with the point of insertion or introduction of the gaskets being located at least above the level of the composition deposited in the reservoir. These sealing gaskets extend further beyond the point of convergence of the side plates, that is, beyond the entrance into the mold cavity of the casting machine, and therein form edge sealing means for the polymeric article being cast within said machine. Since these continuous gaskets function both as a fluid or composition seal for the reservoir in its proximity with the mold forming surfaces, and further form the edges for the mold cavity, there is little likelihood that any of the composition contained both within the reservoir and being advanced into the mold cavity will leak therefrom, but to the contrary, remains conveniently confined for subjection to the casting process and formation into a sheet or film of a polymer. Permanent and stationary seals used between the edges of the side plates and the moving mold surfaces have performed effectively, but on occasion have exhibited a tendency to wear out through abrasion or to pull loose from the binding. The result of such conduct is unwanted leakage of the casting composition.

Structurally, the side plates of the reservoir are partially stabilized through the use of support means such as casters that ride upon the surface of the movable molding surfaces, with said casters being connected to the plates by means of adjustable brackets. Under this construction, the brackets and the attaching casters may be extended in a manner that furnishes a lift of the side plates and entire reservoir from their closeness with the mold forming surfaces, thereby providing a greater dimension intermediate the plate edges and said surfaces. Consequently, a larger sealing means or gasket may be inserted within this intermediate area, then eventually between the mold forming surfaces, and therein thicken the breadth of the sheet being molded by the casting machine. To the contrary, the brackets including their casters may be retracted with respect to the side plates and therein lessen the distance between the edges of the plates and the mold forming surfaces. Naturally a smaller sealing gasket would be accommodated and used under this condition. A primary function of the casters, as previously described, is to provide partial stabilization of the side plates, and therefore the reservoir, upon the surfaces of the casting machine. To acquire precise regulation of the plates to properly accommodate the size of sealing gaskets that must be utilized, adjustment means associated upon each plate can be manipulated to advance or withdraw the plates with respect to said surfaces.

Complete stabilization of the side plates, and their integration into a total reservoir, is achieved through usage of cross bracing that spans between the two plates. Since this bracing is expandible, the two plates may be advanced towards or withdrawn from each other, and in this manner, dictate the width of the polymeric sheet being cast in the machine.

Another aspect of this invention discloses that the sealing gaskets utilized in this casting machine may also be formed from a composition, for example, a vinyl, which may chemically or mechanically react with and/or bond to the polymeragenic composition held by the reservoir and being transferred through the mold cavity. As a result of this bonding action, the final molded sheet of polymer that discharges from the casting machine has rigidly adhering to its side edges the sealing gasket heretofore described. Providing an edge for the cast polymeric sheet in this manner is sometimes structurally desirable, especially where the cast sheets may be eventually cut and utilized for purposes such as a flooring walkway, panelling, or the like. But, in addition, where cast sheets of material are needed without an edging thereon, the sealing gaskets employed in the operation of this invention may be formulated from a material which will not react with the polymer slurry, and therefore not adhere with the same. In this manner, as the cast sheets of polymer are being released from the casting machine, the sealing gaskets may be simply disengaged from sheet edges.

In the process of casting sheets of polymeric material in a continuous casting machine employing the reservoir of this invention, the sealing gaskets, as previously described, are directed and inserted intermediate the edges of the reservoir side plates and the surfaces of the mold forming surfaces. Since the mold forming surfaces, which may comprise continuous belts of stainless steel or other metallic or nonmetallic materials, are moving in a rotary fashion during the casting operation, the soft vinyl gaskets by means of their frictional adherence to the movable mold surfaces concurrently move and simultaneously slide within and along the contiguous edges of the side plates. At approximately the juncture, or more specifically, slightly above the confluence of the two edges of each side plate at the location of the entrance into the mold cavity, the sealing gaskets of each side plate converge with each other and are pressed together between the two mold forming surfaces, and pursuant to this function are further drawn along with the surfaces as they shift through the casting machine in establishing the mold cavity. During this operation, the mechanical or chemical bonding of the sealing gaskets to the polymer being cast may be effected, if it is desirable to adhere a border or an edge to the sheets being cast.

It should be apparent from the foregoing description that the use of the reservoir of this invention in combination with, and formed in conjunction therewith, the mold forming surfaces of a casting machine achieves multipurposes simultaneously during its performance. As explained, the sealing gaskets not only retard leakage of the polymeragenic composition, but while performing this function may also adhere as an edging for the cast sheet.

BRIEF DESCRIPTION OF THE DRAWINGS

In the drawings:

FIG. 3 is a side view of the inlet reservoir of this invention shown in relation with the mold forming surfaces of the continuous casting machine;

FIG. 5 is a partial end sectional view of a side plate, taken along the line 5—5 of FIG. 3;

FIG. 7 is a partial sectional view of the sealing gaskets and polymeric composition being retained intermediate the mold forming surfaces taken along the line 7—7 of FIG. 3.

DESCRIPTION OF THE PREFERRED EMBODIMENT

Figure 1:
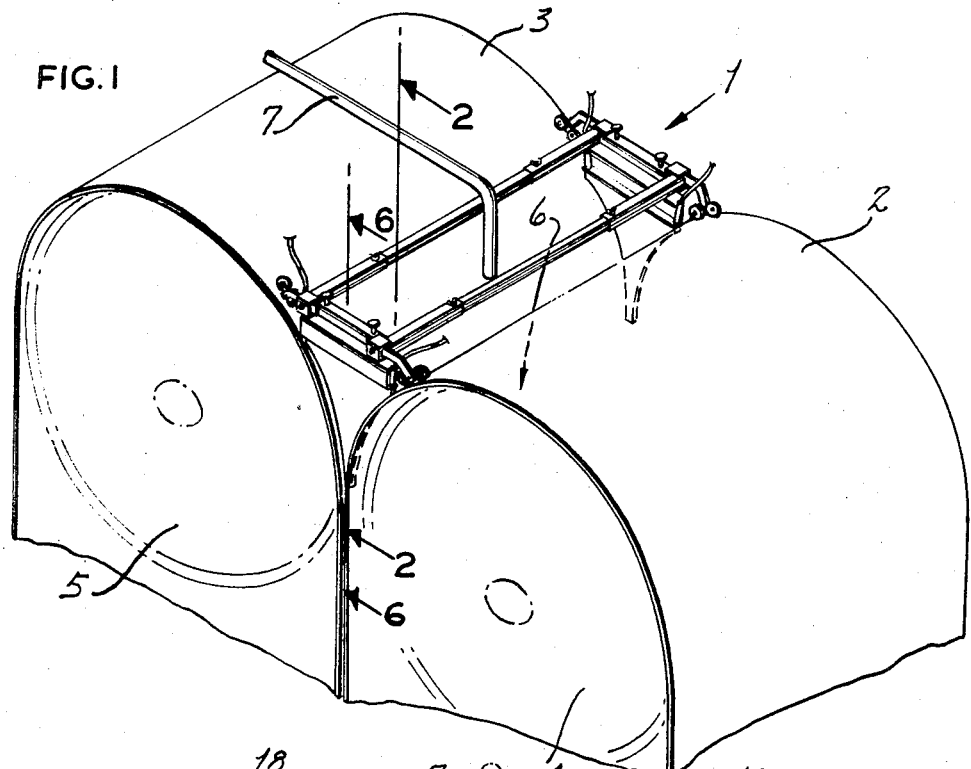
FIG. 1 is a fragmentary perspective view of a continuous casting machine showing the inlet reservoir operatively mounted thereupon.
Figure 2:
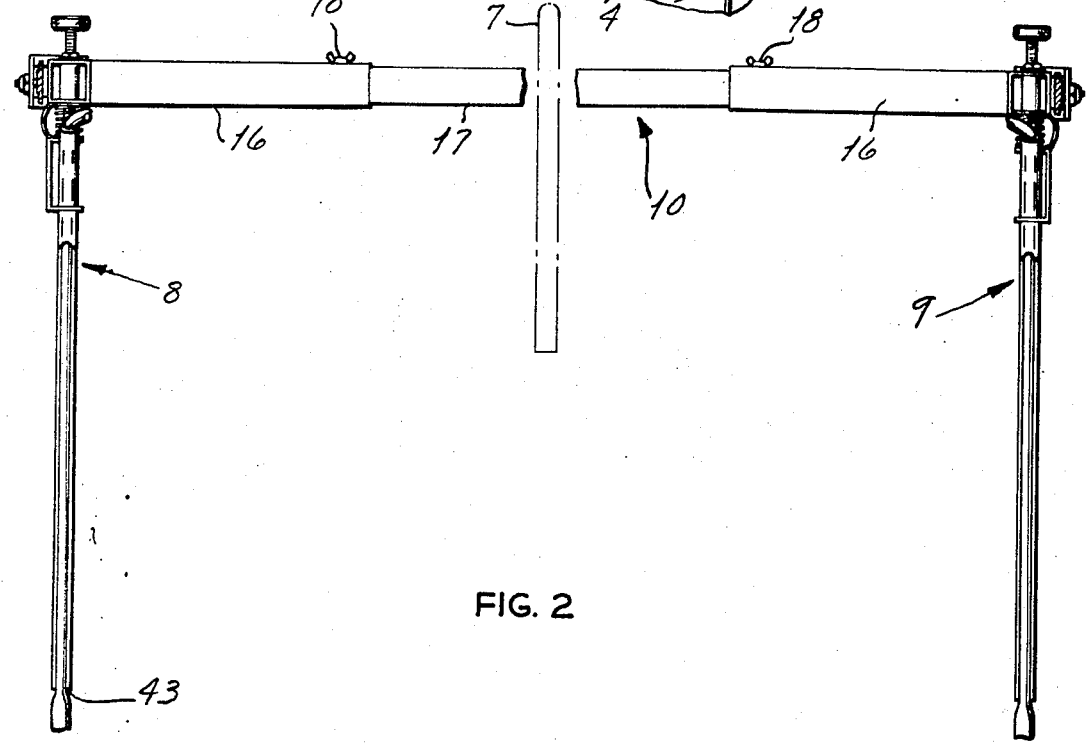
FIG. 2 is a frontal view of the inlet reservoir, being interrupted at its mid-portion, taken along the line 2—2 of FIG. 1.
Figure 4:
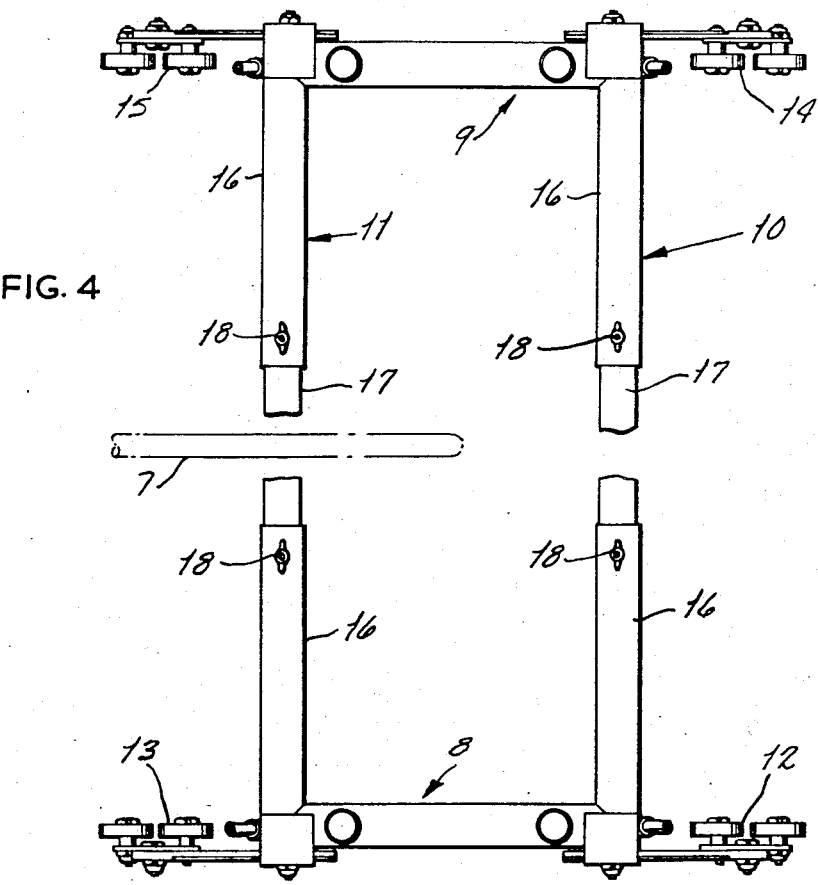
FIG. 4 is a plan view of the inlet reservoir, being interrupted at its mid-portion.

Referring now to the drawings for an illustrative embodiment of the inlet reservoir assembly of this invention, in FIG. 1, reference numeral 1 generally depicts said reservoir as it rests upon a pair of mold forming surfaces 2 and 3 of a continuous polymer casting machine. The mold forming surfaces, although only herein disclosed, comprise endless flexible steel or the like belts which are rendered movable and rotatable upon their respective upper drums and axles 4 and 5. The entire reservoir assembly is retained proximate the entrance to a mold forming cavity, as at 6, that is disposed intermediate the contiguous, but usually not touching, sides of the mold forming surfaces, with said reservoir being receptive to and retaining a supply of the polymeragenic composition to be subjected to molding within the casting machine after it is discharged from the feed inlet line 7. By referring to FIGS. 2 thru 4, the detailed construction of the reservoir assembly is more accurately disclosed, and is shown having a pair of side plates 8 and 9, which are stabilized with respect to their disposition upon the mold forming surfaces through the employment of support means including a pair of cross bracings 10 and 11 spanning transversely between said plates, with each plate further acquiring support through a pair of bracketed casters, 12 thru 15, projecting laterally from their upper edges, with said casters disposed for rotatable association upon the movable mold forming surfaces.

Although the entire support means for the side plates is herein shown as a combination of cross bracings and projecting bracketed casters, it is apparent that other forms of support may be employed for retention of the side plates proximate this entrance into the mold forming cavity, and thereat establish a reservoir for the polymeragenic composition to be cast within the operating machine.

Whereas, in any particular embodiment of a casting machine and reservoir assembly in which sheets of polymeric material may be cast, it may be desirable in certain instances to vary the widths of the particular sheets being formed, the cross bracings 10 and 11 are herein disclosed as being of telescopic construction, wherein their tubular sleeves 16, that mount with the side plates, may be contracted together or extended upon their center parts 17. Any common fastening means, such as the wing nuts 18, may be employed for holding the cross bracings at any particular dimension to which they have been adjusted, thereby setting the width of the sheets to be formed within the casting machine.

Each side plate of the inlet reservoir, as partially revealed in FIG. 5, is constructed having a panel member 19 which is contoured along those edges, as for example, edges 20 and 21 (see FIG. 3), so as to conform with and be adjustable into a contiguous relationship with respect to the proximate movable forming surfaces 2 and 3 that traverse thereby. The upward edge of each plate 19 attaches by means of a common fastener 22 to an angle bracket 23, which in turn has an upper flange 24 connecting to the lower part 25 of the stem portion 26 of an adjustment screw 27. The connectors 28 rigidly fastened to the part 25 of the screw secures said adjustment screw tightly but rotatably to the angle bracket 23, and a flexible spring 29 eliminates any looseness or play in the combination. The stem 26 of the adjustment screw extends through a sleeve 30 integral with a tubular frame 31, and threadedly engages within a nut 32 that mounts upon said tubular frame. Upon a turning of said screw in either direction, the associated angle bracket 23 and panel 19 may be raised or lowered as desired, and the flexible spring 29 insures that the adjusted dimension between the angle bracket-panel combination and the tubular frame is maintained stable once a setting has been made. A flexible guard 33 spanning the spacing between the tubular frame 31 and angle bracket 23 insures that no foreign object may pass through this spacing and enter into the reservoir. Thus, it may be readily observed that upon adjustment of the screw 27, the relationship of the panel 19, and in particular its arcuate edges 20 and 21, may be raised or lowered to a setting with respect to the contiguous mold forming surfaces, for reasons to be hereinafter described.

Each set of casters 12 thru 15 are adjustably mounted to their respective side plates by means of the brackets 34, said brackets being secured to the tubular frame 31 by means of the clamps 35 which clasp the brackets against the tubular frames. A tightening of the bolts 36 secures the brackets in place, whereas their loosening renders the brackets slidable within the clamps with respect to the frame. Through this arrangement, when the mold forming surfaces are substantially increased or decreased in size or angularity, greater than may be compensated through regulation of the adjustment screws 27 for maintenance of the plate edges close to the mold surfaces, then the casters and their brackets may be shifted with respect to the tubular frames to provide for the major adjustment. The fine adjustment may be acquired through manipulation of the screws 27 as aforesaid.

The edges 20 and 21 upon the panels of each side plate are grooved, as at 37 and 38, along those portions of said edges which are maintained in contact, or proximate contact, with the contiguous mold forming surfaces. See FIG. 3. These grooves are formed or provided at these portions of the panels for the purpose of accommodating the edge sealing means, herein shown as tubular gaskets 39 and 40, the latter being arranged for sliding along within these grooved edges at a velocity equivalent to the speed at which the mold forming surfaces also move thereby. To reduce the frictional engagement of these gaskets 39 and 40 with the edge grooves of each plate, the edges may be coated with a friction reducing composition, such as Teflon or the like, which allows for an easy sliding thereby of a gasket, and a minimizing of any scratching or any other type of impairment that may be encountered under such conditions to either the plate edges, sealing gaskets, or even the moving mold forming surfaces. To properly orientate the insertion of these sealing gaskets into their respective locations intermediate the plate edges and the mold forming surfaces, a pair of guides 41 and 42 connect with the ends of each angle bracket 23, with the sealing gaskets arranged for passing through their respective guides in a manner that directs each gasket towards and into the grooves formed along each edge of the plates. As previously described, these sealing gaskets 39 and 40 may be constructed of any form of pliable type material which is effective in providing for a sealing of the fluid composition being retained by the reservoir, and prevent its seepage from the spacings between the plate edges and the moving surfaces of the casting machine, and also from out of the mold cavity. The sealing gaskets may be constructed to any shape or dimension, and preferably the groove formed along the edge of each plate will likewise be formed to a shape which will most easily facilitate the movement of the sealing gasket therethrough. The attraction and movement of the sealing gaskets is effected, in this particular embodiment, by means of their being pressed together or nipped between the two mold forming surfaces as said gaskets are freed from near the lower ends 43 of each end plate. See also FIG. 2. Naturally, the size of the gaskets utilized will depend upon the thickness dimension of the particular polymeric sheet being cast in the machine, since if a sheet of large thickness is being molded, the gaskets likewise will have to be at least slightly larger in their outer diameter to provide for their compression intermediate said plates, at least to the thickness desired. This is especially true where the sealing gaskets, as they are released from near the lower end 43 of each side plate, may be quarter-turned and thereby become juxtaposed with respect to each other intermediate the mold forming surfaces. (This arrangement not shown.) On the other hand, where the two sealing gaskets are simply pressed upon each other so as to form the edge sealing means for the sheet being cast within the casting machine, the outside diameter of each gasket will only have to be at least slightly greater than one half the dimension between the two mold surfaces, tolerance, of course, being made for the compressibility of the gasket. See FIG. 7. Thus, as previously described above, these sealing gaskets not only act to prevent an untimely discharge of the composition retained in the reservoir, but in addition, form the edge sealing means for the particular polymeric sheet being cast within the casting machine.

Figure 6:
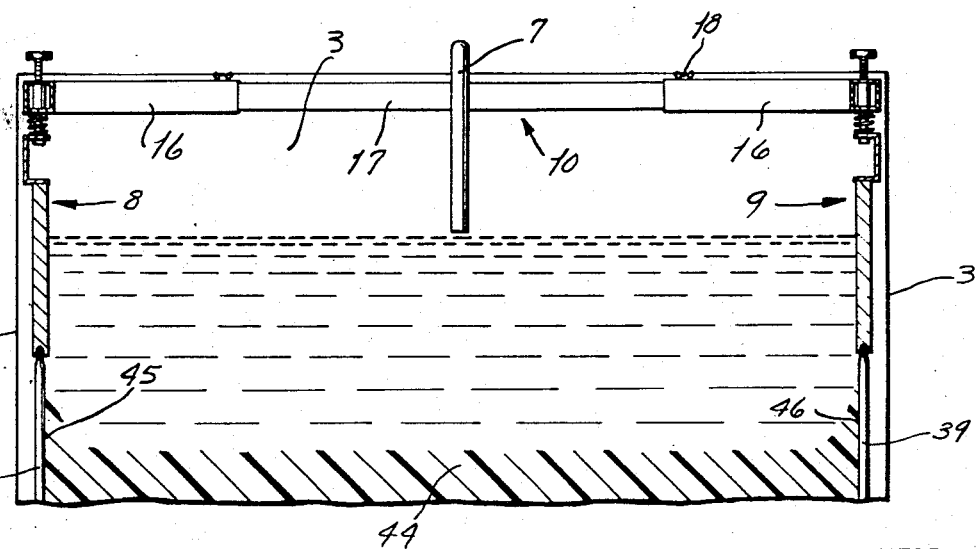
FIG. 6 is a transverse sectional view, slightly distorted in dimensions, of the inlet reservoir taken along the line 6—6 of FIG. 1, also showing the polymeragenic composition confined therein and in its commencing stage of being cast and adhering to the gaskets as it traverses through the casting machine.

Referring to FIG. 6, it can be seen that the polymeragenic composition is retained intermediate the two end plates 8 and 9, and that the composition is gradually introduced into the entrance 6 of the mold cavity between the two mold forming surfaces, the surface 3 being herein shown. As the composition is gradually fed into the mold cavity, its treatment by the casting machine commences so as to provide for its polymerization or solidification into sheet form, as at 44, and as this solidification or setting of the sheet is effected, it gradually adheres, as at 45 and 46, to the edge sealing means 39 and 40. This sealing engagement may be accomplished either through a chemical bonding of the composition with these gaskets, or the adherence may be caused by a mechanical fusing of the members. Where chemical bonding is desired, the gaskets might be formulated from certain compositions which include a vinyl polymer or a vinyl copolymer, such as polyvinyl chloride. Accordingly, where mechanical or chemical adherence is not desired, the various rubber compositions, such as butyl rubber, natural rubber or silicone rubber, or a polyethylene composition might be used. In any event, the final cast sheet as it is discharged from the casting machine is equipped with a side edging comprised of the edge sealing means or gaskets herein disclosed.

Numerous variations in the construction and arrangement of the inlet reservoir of this invention, within the scope of the appended claims, will occur to those skilled in the art in the light of the foregoing disclosure. For example, various other sealing means from the particular embodiments herein described may be employed as the useful gaskets of this invention. In addition, the end plates of this invention may be adjustably mounted to the side frames of the casting machine rather than include their own support means as hereinbefore described. These examples are merely illustrative, and are contemplated as the type of changes that might be made but yet be included within the scope of this invention, and be protected by any claims to patent that may issue thereon.

Having thus described the invention, what is claimed and desired to be secured by Letters Patent is:

1. In the process for continuously casting polymeric sheet or film wherein a polymeragenic composition is deposited in an inlet reservoir before introduction into a mold cavity disposed between a pair of movable mold forming surfaces, said inlet reservoir including a pair of side plates whose edges are maintained in proximity with said movable mold forming surfaces, the improvement comprising retaining said side plates of the reservoir stationary with respect to the movable mold forming surfaces, motivating sealing gaskets intermediate the side plate edges of the reservoir and the contiguous portions of the movable mold forming surfaces through the movement of said mold forming surfaces thereby retarding leakage of the retained composition, thereafter directing said gaskets intermediate said movable mold forming surfaces to therein define the side edges of the composition being cast within the mold cavity, while simultaneously pressing the gaskets between said surfaces to prevent leakage of said composition from the mold cavity.

2. The invention of claim 1 including chemically reacting said composition with the sealing gaskets to induce their bonding into an integral structure.

3. The invention of claim 2 wherein the composition is polymeragenic and each sealing gasket is formed of a vinyl.

4. The invention of claim 1 including mechanically bonding said composition with the sealing gaskets to induce their adherence into an integral structure.

References Cited
UNITED STATES PATENTS

| | | | |
|---|---|---|---|
| 3,422,178 | 1/1969 | Junker et al. | 264—51 |
| 2,141,405 | 12/1938 | Randall | 18—4 |
| 2,922,204 | 1/1960 | Mason | 18—4 |
| 2,956,310 | 10/1960 | Roop et al. | 264—216 |
| 3,168,605 | 2/1965 | Ellegast et al. | 264—216 |
| 3,257,484 | 6/1966 | Barnette | 18—4 |

ROBERT F. WHITE, Primary Examiner

J. R. THURLOW, Assistant Examiner

U.S. Cl. X.R.

18—4, 15; 264—51, 216, 261, 316, 331